UNITED STATES PATENT OFFICE.

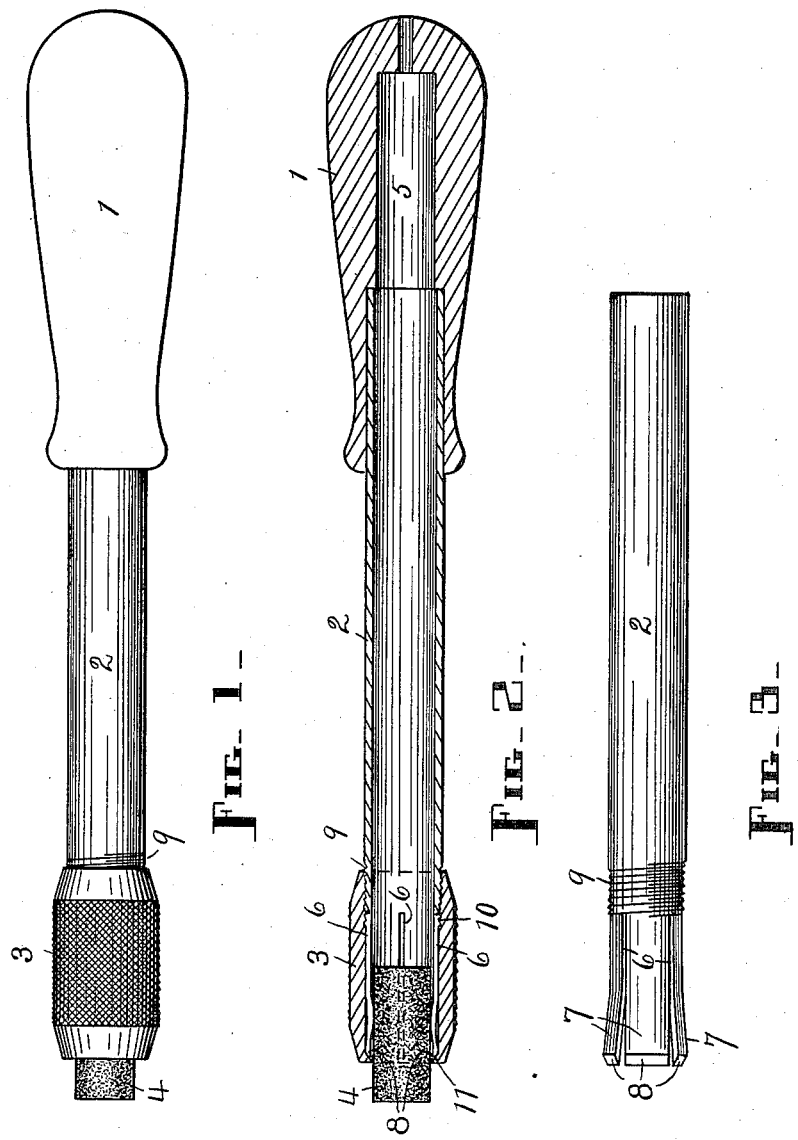

MORRIS D. FLETCHER, OF SPRINGFIELD, MASSACHUSETTS, ASSIGNOR TO FRANK E. BIDWELL, OF SPRINGFIELD, MASSACHUSETTS.

WHEEL-DRESSER AND TOOL-HOLDER.

1,024,126.   Specification of Letters Patent.   Patented Apr. 23, 1912.

Application filed July 17, 1911. Serial No. 638,854.

*To all whom it may concern:*

Be it known that I, MORRIS D. FLETCHER, a citizen of the United States of America, residing at Springfield, in the county of Hampden and State of Massachusetts, have invented a new and useful Wheel-Dresser and Tool-Holder, of which the following is a specification.

My invention relates to improvements in devices for holding dressers so-called employed in grinding the peripheries of emery and other abrading and polishing wheels for the purpose of truing such wheels or their peripheries, or for holding various kinds of tools, such as wood-turning, wood-carving, and burnishing tools, and consists of a handle having a bore therethrough of different diameters, a hollow cylindrical shank fitted to said handle at one terminal and formed into an elastic chuck at the opposite terminal, and a nut for contracting the cleft terminal or chuck of said shank on the dresser or tool, all as hereinafter set forth.

The object of my invention is to produce a simple, convenient and comparatively inexpensive, yet strong and durable, device for holding securely any tool for which said device is adapted, and especially for holding a solid cylindrical stick of carborundum or other abrading material while the exposed end of such stick is being applied to the periphery of an emery or similar wheel for the purpose of grinding or dressing the same, to the end that the operator is provided with a safe implement which he can grasp firmly in his hands, and with it apply forcibly and guide with precision the tool or abrading stick with which the holding device is supplied.

A further object is to provide a holder which is capable of utilizing abrading sticks of various lengths, hence sticks that would otherwise be thrown away because too short to be held in the bare hands can be used and a considerable saving thus effected.

Other objects will appear in the course of the following description.

I attain these objects by the means illustrated in the accompanying drawings, in which—

Figure 1 is a side elevation of a holder which embodies a practical form of my invention, an abrading stick or dresser being shown in position in such holder in this and the next view; Fig. 2, a central longitudinal section through such holder, and, Fig. 3, a side elevation of the tubular shank.

Similar figures refer to similar parts throughout the several views.

Although my holder is useful in connection with different kinds of tools, as hereinbefore observed, I have illustrated and will describe it as applied to a wheel-dresser, since in this field or for this purpose said holder is especially valuable and serviceable, and the manner of its application to and use with cutting or burnishing tools does not materially differ from what is herein set forth.

In the drawings, a handle is represented at 1, a hollow cylindrical shank at 2, and a nut at 3.

At 4 is represented a piece of abrading material which is round in cross-section and solid. As previously intimated, the member 4 is known as a dresser, it being the member which is applied directly to emery and other abrading and polishing wheels for the purpose of shaping and truing them by grinding.

The handle 1 has a central longitudinal bore 5 therein which extends the whole length thereof, and the diameter of this bore at its inner or front terminal is large enough to receive the plain or unbroken terminal of the shank 2, the inserted portion of said shank being secured in place with a little shellac or otherwise. The diameter of the central portion of the bore 5 is the same as that of the shank 2 on the inside. The rear or outer section of the bore 5 is quite small, being only of sufficient size to enable a fairly stiff wire or rod to be inserted when necessary for the purpose presently to be explained.

The tubular shank 2 is made of thin metal which is resilient, and this shank has a plurality of slits or slots therein which extend longitudinally of said shank from the outer end, a chuck for the dresser 4 being thus formed or produced. The outer terminal portions of the split part of the shank 2 flare, as shown at 7, in Fig. 3, so as to provide a sufficient amount of gripping surface for the dresser 4, when such portions are contracted, the inner diameter of the rest of such split part being a little larger than that of said dresser. The outer ends of the chuck-forming portions of the shank, which constitute the nose of the chuck, are beveled at 8 in such a manner as to enable the nut 3 to produce a wedging action and contract such portions, when such nut is screwed on fully to said shank. The shank is exteriorly screw-threaded back of the slots 6 and 9.

The nut 3 is interiorly screw-threaded at its rear terminal, as shown at 10, in Fig. 2, to engage the screw-threads 9. The internal diameter of the bore of the nut 3 is approximately the same as the external diameter of the shank 2, excepting at the front end where such bore is constricted and a beveled shoulder 11 formed, the bevel of such shoulder corresponding with the beveled portions 8 of the shank, with which beveled portions said shoulder is designed to coöperate. The beveled shoulder 11 appears in Fig. 2.

In practice, the nut 3 is first rotated in the direction to actuate the shoulder 11 away from the nose of the chuck portion of the shank 2. This allows the parts formed by the slots 6 to expand into the space in the nut 3 behind the shoulder 11. Next the dresser 4 is thrust into the advanced end of the nut 3 and introduced into the shank 2, and if long enough even into the handle 1, being thus inserted until only enough is left exposed to enable it to be used to advantage. Finally the nut 3 is screwed toward the handle 1 until the shoulder 11 encounters the beveled parts 8 and contracts the parts of the shank which are separated by the slots 6, causing them to grip the dresser 4 firmly and to hold it securely. The implement is now ready for use for any purpose for which it is designed.

Owing to the support which the holder affords to all of that portion of the dresser that is within said holder, there is no liability of breaking said dresser, whether the same be long or short, and because of the nature of such support a very short dresser can be used.

From time to time as the dresser wears away it is advanced by loosening the nut, drawing out the dresser, and retightening said nut. Should any difficulty be experienced in doing this or in removing the dresser altogether, after the nut is loosened, a wire or rod is inserted into the bore 5, through the butt end of the handle 1, and passed along through the shank 2 until the dresser 4 is reached, when a forcible thrust will cause said dresser to be dislodged by said wire or rod. That it is sometimes necessary to resort to this means of dislodgment is due to the fact that the gripping parts of the shank become so firmly engaged with the dresser as to be unable to spring outwardly, when released by the shoulder 11, or otherwise to relax their grip on said dresser to an extent sufficient for the partial or entire withdrawal of the same with the fingers applied to the exposed end thereof. The dresser is, of course, accessible to a wire or rod introduced through the butt end of the handle regardless of the length of such dresser, and it may upon occasion be necessary to use such wire or rod for a long dresser which extends into the handle, as well as for a short dresser which extends only a little way into the shank.

By extending the passageway for the dresser 4 into the handle 1, as I do, (that section of the bore 5 which is between the inserted end of the shank 3 and the small entrance section of the bore in the butt end of said handle, being the part of the passageway referred to), I am able to use a shorter shank without reducing the length of the dresser passageway, than I could if no part of the handle were utilized for the reception of the dresser. Some considerable saving in tubing is thus effected, while the handle is in no way impaired.

It is obvious that modifications and changes in the shape, size, and construction of this holder, within certain reasonable bounds, may be made without departing from the nature of my invention.

What I claim as my invention, and desire to secure by Letters Patent, is—

A wheel-dresser and tool holder comprising a handle having a bore therethrough divided into sections of different diameters, a hollow shank fitted at one end into said bore and having a chuck at the other end for the implement to be held, the parts being so constructed that there is a passageway for such implement extending through such shank and beyond the same into said handle, and a nut arranged on said shank to engage such chuck and cause the same to grasp said implement.

MORRIS D. FLETCHER.

Witnesses:
  F. A. Cutter,
  A. C. Fairbanks.

Copies of this patent may be obtained for five cents each, by addressing the "Commissioner of Patents, Washington, D. C."